United States Patent
Lange

[11] Patent Number: 6,127,043
[45] Date of Patent: Oct. 3, 2000

[54] MULTILAYERED SHEET, PROCESS FOR THE PRODUCTION THEREOF AND USE THEREOF

[75] Inventor: Winfried Lange, Dompfaffenstr., Germany

[73] Assignee: Sengewald Verpackungen GmbH, Germany

[21] Appl. No.: 09/142,975

[22] PCT Filed: Oct. 23, 1996

[86] PCT No.: PCT/DE96/02012

§ 371 Date: Nov. 20, 1998

§ 102(e) Date: Nov. 20, 1998

[87] PCT Pub. No.: WO97/34951

PCT Pub. Date: Sep. 25, 1997

[30] Foreign Application Priority Data

Mar. 21, 1996 [DE] Germany ........................ 296 05 214 U
Sep. 29, 1996 [DE] Germany ........................... 196 40 038

[51] Int. Cl.$^7$ ...................................................... B32B 27/08
[52] U.S. Cl. ......................... 428/515; 428/516; 428/517; 428/519
[58] Field of Search ................................... 428/515, 516, 428/517, 519

[56] References Cited

U.S. PATENT DOCUMENTS 4,778,697  10/1988  Genske et al. ............................. 428/35

FOREIGN PATENT DOCUMENTS

| 380 145 | 8/1990 | European Pat. Off. . |
| 437 856 | 4/1991 | European Pat. Off. . |
| 704 482 | 4/1996 | European Pat. Off. . |
| 739 713 | 10/1996 | European Pat. Off. . |
| 4410876 | 10/1995 | Germany . |
| WO 95 26177 | 10/1995 | WIPO . |

*Primary Examiner*—Edward J. Cain
*Attorney, Agent, or Firm*—Jenkens & Gilchrist

[57] ABSTRACT

A multilayered film having a polymer outer layer, a polymer connecting layer and a heat-sealable polymer inner layer. At least one polymer connecting layer being made of a mixture of a polypropylene homopolymer and/or a polypropylene copolymer and at least one thermoplastic elastomer and/or a mixture of a polypropylene homopolymer and/or a polypropylene copolymer and polyisobutylene. The heat-sealable polymer inner layer, which is adjacent to the connecting layer, is made of a polypropylene homopolymer and/or a polypropylene copolymer with at least one thermoplastic elastomer; excluding polypropylene homopolymers and/or polypropylene copolymers made up predominantly of polyethylene. The multilayered film is used for making packaging materials to package foods, medical fluids or solutions, such as saline solutions, amino acid solutions, dialysis solutions, blood or blood substitute solutions.

32 Claims, No Drawings

MULTILAYERED SHEET, PROCESS FOR THE PRODUCTION THEREOF AND USE THEREOF

BACKGROUND OF THE INVENTION

1. Field of the Invention

The invention relates to a multilayered film with a polymer outer layer, a polymer connecting layer, and a heat-sealable polymer inner layer, to methods for producing it, and to its use.

2. Background Information

Such multilayered films or films, which are preferably heat-sealable, have long been used to produce liquid-tight and in particular water-vapor-proof bags. They are used particularly for bags used as primary packages for medical fluids and solutions. They can also be used as drainage bags. It is then usually sufficient if they are liquid-tight.

In special cases, especially whenever they are used for primary packaging for oxygen-sensitive materials, a suitable gas barrier property may also be desired. This is the case for instance when they are used to package amino acid solutions, or whenever the entry or release of $CO_2$, for instance, may cause an undesired change in pH, or when the contents oxidize and thereby change if oxygen enters them.

For holding medical fluids and solutions, aside from the glass bottle, which is heavy and hard to handle, soft PVC bags are conventionally often used. They are satisfactory in terms of their flexibility and sealability, but they have the disadvantage that the plasticizers they contain readily diffuse, by migration within the PVC, into the interior of the bag, where they can cause utterly unwanted contamination of the contents. Especially in the case of solutions for IV or other infusions, it is extremely undesirable for these plasticizers to enter the patient's body along with the solution.

Another disadvantage of the known soft PVC bags is that because of the chlorine compounds and dioxins that are produced when they are incinerated, they present problems of waste disposal. It has already been proposed that instead of PVC (polyvinyl chloride), polyethylene bags be used. However, this material has the disadvantage that most types can be autoclaved (steamsterilized) at a maximum temperature of only 121° C. The polyethylene alternatives also often lack the desired transparency and flexibility.

U.S. Pat. No. 4,778,679 to American National Can Company describes a multiple layer film which is also sterilizable and which has a combination of a connecting layer, primarily having HDPE, and a polypropylene mixture with a TPE as its outer layer. Combinations of polypropylene-based films with films having polyethylene-based polymers are employed, because the latter component avoids the brittleness and inflexibility of polypropylene while assuring that the film is free of halogen and is weldable. However, this known film was in need of improvement in terms of its external appearance (transparency).

German Patent Disclosure DE-A 44 10 876 has described a coextruded peelable multilayered film with a polypropylene-TPS mixture with an inner layer that can be heat-sealed at a temperature of 115 to 150°, a polypropylene homopolymer layer as the outer layer, and a polypropylene/VLDPE layer as the connecting layer. However, this known multilayered film is in need of improvement, both in terms of its transparency and flexibility and in terms of the adhesion of the layers forming the multilayered film to one another, as can already be inferred from the fact that it is a peelable film, i.e. one whose layers can be separated from one another.

European Patent EP 0 437 846 (to Idemitsu) also describes a peelable multilayered film product based on polystyrene, in which layers containing polypropylene are produced jointly with layers containing polystyrene, in the form of easily separable—that is, peelable—layers.

It can thus be inferred that in many known multilayered films with a high proportion of polypropylene, joining the layers to one another, which is essential for both the strength and appearance of the film composite, is problematic.

The basic demands made of multilayered films for use in packaging aqueous solutions, especially solutions for IV infusion and the like, are thus that they have high flexibility very good transparency low water vapor permeability; and are physiologically safe, with mechanical stability;

sealable with permanently heated tools or be pulse-weldable autoclavable, even above 121° C., and that for particular foods or medical fluids and solutions, an additional barrier effect against oxygen and/or carbon dioxide may also be present.

SUMMARY OF THE INVENTION

It is accordingly the object of the invention to create a transparent, weldable, i.e. pulse-weldable or heat-sealable, multilayered film, which is easy to dispose of and is an alternative material for the soft PVC previously used, and which because of its particular properties can also be intended for other applications outside the usual ones for soft PVC.

According to the invention, this object is attained by a multilayered film comprising a polymer outer layer, a polymer connecting layer and a heat-sealable polymer inner layer, wherein at least one connecting layer is a mixture of a polypropylene homopolymer and/or a propylene copolymer and at least one thermoplastic elastomer and/or a mixture of a polypropylene homopolymer and/or a propylene copolymer and polyisobutylene; and the inner layer which is adjacent to the connecting layer, comprises a mixture of a polypropylene homopolymer and/or a polypropylene copolymer with at least one thermoplastic elastomer; with the exception of polypropylene homopolymers and/or polypropylene copolymers made up predominantly of polyethylene.

The inner layer preferably has a lower sealing temperature than the outer layer; the heat-sealing can then be done with permanently heated tools. However, it is also possible to produce multilayered films without this kind of melting point gradient of the films; in that case, the films must for instance be pulse-welded.

DETAILED DESCRIPTION OF THE INVENTION

Advantageously, at least one thermoplastic elastomer is selected from the group comprising styrene block copolymers (TPE-S, such as SEPS, SIS, SEBS, SBS), polyether esters (TPE-E), polyurethanes (TPE-U), polyether amides (TPE-A), or from the group comprising EPDM/PP mixtures or the group comprising butyl rubber/PP mixtures.

TPE as used herein is the conventional abbreviation for thermoplastic elastomer.

SEBS is used herein to mean styrene-ethylene/butylene-styrene triblock polymer; SBS means a styrene-butylenestyrene diblock polymer; SEPS means a styrene-ethylene/propylene-styrene triblock polymer; and SIS means a styrene-isoprene-styrene triblock polymer.

EPDM is understood to mean a terpolymer of ethylene, propylene and a nonconjugated diene (EPDM) and/or ethylene-alpha-olefin copolymer.

Butyl rubber is understood to mean a copolymer of isobutylene and isoprene.

For the mixing with polypropylene, along with the thermoplastic elastomers described, a polyisobutylene (mixed in at the same time or added later) that has high flexibility and a low melting point may be used in addition or alone.

It is especially preferred that the at least one intermediate layer have a higher proportion of thermoplastic elastomer, because greater flexibility is thereby attained. However, it may also be appropriate to use polyisobutylene, in addition or alternatively, as the intermediate layer.

It may be necessary that the outer layer be a barrier against oxygen and/or carbon dioxide.

This can be attained for instance by providing that the outer layer is selected from the group comprising polyamide 6, polyamide 66, polyamide 610, polyamide 6/66, polyamide 66/610, aromatic polyamide, or mixtures of these materials.

A preferred outer layer comprises a mixture of from 65 to 95 weight-% of an aromatic polyamide with a polyamide 6/6. For example, a polyamide 66 with a viscosity number of at least 200 (per DIN 53727/sulfuric acid) is suitable.

However, such barrier layers must be secured to the layered composite by means of an adhesion promoter and can be provided in the form of a third, fourth or further outer layer.

It may also be appropriate, if gas barrier properties are not needed, for the outer layer to be a polypropylene homopolymer, or a polypropylene copolymer. This layer is suitable particularly in combination with a connecting layer comprising a polypropylene compound of a polypropylene homopolymer, a TPE-S, and a plasticizer, and a heat-sealable inner layer comprising a polypropylene compound of a polypropylene homopolymer and a TPE-S.

For the heat-sealing process, an outer layer of a polypropylene homopolymer is preferred.

As the outer layer, besides a polypropylene copolymer, a polyisobutylene/polypropylene mixture may be used; in these cases, because of the melting properties of the outer layer, the multilayered film can then be joined to the sealing layer by means of pulse welding.

The at least one connecting layer in the composite film assures not only the adhesion of the outer and inner layers to one another, but also the flexibility of the multilayered film. Thus the material for the connecting layer is selected with a view to its being highly flexible and also entering into good adhesion to the adjacent layers. A further goal is the preferably very good contact transparency of this connecting layer in the multilayered film, so as not to detract from the total transparency of the film.

Such a composite may for instance be produced by coextrusion; because of the coextrusion, the layers adhere to one another without problems, and good sealability of the inner film is still assured by a melting point gradient in the layers from the outside inward.

A multilayered film without a pronounced temperature gradient may also be made, however; it is then weldable by the pulse welding process, for instance.

A typical total film thickness is in the range from 100 to 350 µm, for example.

It is especially preferred that the layers be coextruded; the provision of adhesion enhancers or adhesives can then be avoided, and the multilayered film can be made in a single production step. Optionally, however, outer layers may be laminated on in a manner known per se.

Especially preferably, the coextruded film is coextruded in layers from top to bottom and then chilled. Preferably the chilling is done by extrusion into a water bath. As a result of this chilling, the amorphous state of the polymer is obtained from the melt, and both its flexibility and its transparency are improved markedly over unchilled films.

Particularly for the use of the multilayered film to make bags, it is favorable if the material is extruded in the form of tubing. This prevents contamination of the insides of the bag by germs, especially if an inert gas (such as nitrogen) is used to inflate the film tubing, instead of the ambient air.

It is especially preferred that the multilayered film of the invention be used to produce bags for foods and for medical fluids and solutions.

To name only a few concrete examples of its application:

a) for foods:

Wine, freeze-dried coffee extract and jam.

b) for medical fluids and solutions:

Saline solutions, blood, blood substitute solutions, dialysis solutions, and amino acid solutions—but other paste-like or liquid or dry materials may also be packaged, especially those that might have to be sterilized or are placed in the packages while hot.

For certain needs, it may not be necessary to chill the film, in the form of coextruded tubing with the width of the later bag, in a water bath. In that case, the film is coextruded in a film blowing or film casting system and processed further in the form of a tube or flat length of material without water cooling.

This can be done for instance in such a way that in the next processing step, one or more film layers are laminated onto the coextruded film. Such films may be selected for certain barrier properties (for instance against oxygen) or to increase the melting point gradient markedly.

Further processing of such a coextruded film is preferably done in the form of a double flattened length of material, using commercially available packaging systems with three-edge sealing.

The bags made in this way are often used for medical wastes in the form of fluids and solutions (such as drainage fluids).

The invention will be described in further detail below in terms of exemplary embodiments, to which the scope of the invention is in no way limited.

EXAMPLE 1

Polypropylene-based multilayered film:

Outer layer:

DAPLEN KF 201 (available from PCD in Linz, Austria)

Polypropylene homopolymer with a thickness of 15 µm

Connecting layer:

CAWITON MED PR 3530 (available from Wittenburg in Bussum, The Netherlands)

Polypropylene mixture with a thickness of 95 µm, comprising a) polypropylene homopolymer b) SEBS in the form of TPE-S c) plasticizer Inner layer:

CAWITON MED PR 3663 (available from Wittenburg in Bussum, The Netherlands)

Polypropylene mixture with a thickness of 40 μm, comprising a) polypropylene homopolymer b) SEBS in the form of TPE-S The total thickness of the composite multilayered film extruded into a water bath was approximately 150 μm.

A clear, readily sealable film was obtained.

EXAMPLE 2

Polypropylene-based multilayered film:

Outer layer:

DAPLEN KF 201 (available from PCD in Linz, Austria)

Polypropylene homopolymer with a thickness of 20 μm

Connecting layer:

CAWITON MED PR 3530 (available from Wittenburg in Bussum, The Netherlands)

Polypropylene mixture with a thickness of 125 μm, comprising a) polypropylene homopolymer b) SEBS in the form of TPE-S c) plasticizer Inner layer:

CAWITON MED PR 3663 (available from Wittenburg in Bussum, The Netherlands)

Polypropylene mixture with a thickness of 55 μm, comprising a) polypropylene homopolymer b) SEBS in the form of TPE-S The total thickness of the composite multilayered film extruded into a water bath was approximately 200 μm.

EXAMPLE 3

Polypropylene-based multilayered film:

Outer layer:

DAPLEN KF 201 (available from PCD in Linz, Austria)

Polypropylene homopolymer with a thickness of 25 μm

Connecting layer:

CAWITON MED PR 3530 (available from Wittenburg in Bussum, The Netherlands)

Polypropylene mixture with a thickness of 155 μm, comprising a) polypropylene homopolymer b) SEBS in the form of TPE-S c) plasticizer Inner layer:

CAWITON MED PR 3663 (available from Wittenburg in Bussum, The Netherlands)

Polypropylene mixture with a thickness of 70 μm, comprising a) polypropylene homopolymer b) SEBS in the form of TPE-S The total thickness of the composite multilayered film extruded into a water bath was approximately 250 μm.

EXAMPLE 4

Multilayered film with barrier effect against oxygen:

Outer layer:

90 weight-% Nylon MXD 6 (available from Mitsubishi International, Dusseldorf, Germany)

10 weight-% AKULON S 240 C (available from DSM, Dusseldorf, Germany)

Polyamide with a thickness of 20 μm

Connecting layer 1:

ADMER NF QB 540 E (available from Mitsui in Dusseldorf, Germany)

Adhesion promoter PA-PP with a thickness of 4 μm

Connecting layer 2:

CAWITON MED PR 3530 (available from Wittenburg in Bussum, The Netherlands)

Polypropylene mixture with a thickness of 120 μm, comprising a) polypropylene homopolymer b) SEBS in the form of TPE-S c) plasticizer Inner layer:

CAWITON MED PR 3663 (available from Wittenburg in Bussum, The Netherlands)

Polypropylene mixture with a thickness of 55 μcomprising a) polypropylene homopolymer b) SEBS in the form of TPE-S The total thickness of the composite multilayered film extruded into a water bath was approximately 200 μm. The film was readily heat-sealable and was gastight against oxygen under normal ambient conditions.

EXAMPLE 5

Multilayered film:

Outer layer:

Novolen 3200 HX (available from BASF, Ludwigshafen, Germany)

Polypropylene copolymer with a thickness of 20 μm

Connecting layer:

CAWITON MED PR 3530 (available from Wittenburg in Bussum, The Netherlands)

Polypropylene mixture with a thickness of 125 μm, comprising a) polypropylene homopolymer b) SEBS in the form of TPE-S c) plasticizer Inner layer:

CAWITON MED PR 3663 (available from Wittenburg in Bussum, The Netherlands)

Polypropylene mixture with a thickness of 55 μcomprising a) polypropylene homopolymer b) SEBS in the form of TPE-S The total thickness of the composite multilayered film extruded into a water bath was approximately 200 μm.

These multilayered films, and bags made from them, can be heat-sterilized especially for medical purposes; also, they do not give off any ingredients of the films—such as plasticizers or the like—to aqueous materials located inside the bags.

Although the invention has been described in detail in terms of preferred exemplary embodiments, it is evident to one skilled in the art that manifold modifications, of the kind included within the scope of the claims, are possible.

What is claimed is:

1. A non-peelable multilayered film comprising at least one polymer outer layer, at least one polymer connecting layer, and a polymer inner layer, the at least one connecting layer being located between the outer layer and the inner layer, one of the connecting layer being located adjacent to the outer layer, wherein at least one connecting layer comprises (a) a polypropylene compound and/or a blend of a polypropylene homopolymer and/or copolymer, and (b) at least one thermoplastic elastomer and/or polyisobutylene, and the inner layer comprises (a) a polypropylene compound of a polypropylene homopolymer and/or copolymer and (b) at least one thermoplastic elastomer.

2. The multilayered film of claim 1, wherein at least one thermoplastic elastomer is selected from the group consisting of styrene block copolymers, polyether esters, polyurethanes, polyether amides, EPDM/polypropylene blends and butyl rubber/polypropylene blends.

3. The multilayered film of claim 1, wherein at least one outer layer is selected from the group consisting of polyamide 6, polyamide 66, polyamide 610, polyamide 6/66, polyamide 66/610, aromatic polyamide, mixtures thereof, polypropylene homopolymers, polypropylene copolymers and polypropylene/polyisobutylene blends.

4. The multilayered film of claim 3, wherein the outer layer comprises a mixture of from 65 to 98 weight % of an aromatic polyamide with a polyamide 66.

5. The multilayered film of claim 4, wherein the polyamide 66 is a polyamide having a viscosity number of at least 200 (per DIN 53727/sulfuric acid).

6. The multilayered film of one of claim 1, wherein at least one outer layer has a barrier effect with regard to oxygen and/or carbon dioxide.

7. The multilayered film of claim 1, wherein the film further comprising an adhesive layer, the adhesive layer is located adjacent to the outer layer and is selected from the group comprising adhesion promoters for polypropylene/polyamide.

8. The multilayered film of claim 1, wherein the connecting layer and the inner layer comprise a compound of a polypropylene copolymer and a TPE-S.

9. The multilayered film of claim 7, wherein the connecting layer further comprises plasticizers and/or processing adjuvants.

10. The multilayered film of claim 1, wherein the polypropylene homopolymer comprises a nucleating agent.

11. The multilayered film of claim 1, wherein the multilayered film is heat-sterilizable.

12. The multilayered film of claim 1, wherein the film thickness is from 100 to 350 µm.

13. The multilayerd film of claim 1, wherein there is a temperature gradient in the melting point of the layers from the outer layer to the inner layer, so that under the influence of temperature the inner layer melts before the outer layer.

14. A method for producing a multilayered film of claim 1, comprising coextruding at least two layers of the multilayered film.

15. The method for producing a multilayered film of claim 14, wherein the three layers are vertically coextruded and then the layers are chilled.

16. The method of claim 15, wherein the chilling is effected by coextrusion into a water bath.

17. The method of claim 14, wherein the layers are extruded in the form of a tube or a flat length of material.

18. The method of claim 17, wherein the material is extruded in the form of a tube.

19. The method of claim 14, wherein the outer layer is applied by laminating.

20. In a packaging material for packaging a substance, the packaging material comprising a polymer, wherein the improvement comprises the packaging material being the multilayered film of claim 1.

21. A package comprising a packaging material and a substance packaged therein, wherein the packaging material comprising the multilayered sheet of claim 1, and the substance is a food or drink selected from the group consisting of wine, freeze-dried coffee extract, soups, jam, and frozen foods.

22. A package comprising a packaging material and a substance packaged therein, wherein the packaging material comprising the multilayered sheet of claim 1, and the substance comprises medical fluids or solutions, selected from the group consisting of saline solutions, amino acid solutions, dialysis solutions, blood substitute solutions and blood.

23. A packaging material in a form of a bag, the packaging material comprising the multilayered sheet of claim 1, the bag for packaging pastelike products.

24. The multilayered film of claim 1, wherein the at least one thermoplastic elastomer is selected from the group consisting of a styrene-ethylene/butylene-styrene triblock polymer, a styrene-butylene-styrene diblock polymer, a styrene-ethylene/propylene-styrene triblock polymer and a styrene-isoprene-styrene triblock polymer.

25. The multilayered film of claim 8, wherein the TPE-S is a styrene-butylene-styrene diblock polymer in an amount of 10 to 50 weight %.

26. The method of claim 18, wherein a width of the tube when flattened is equal to the width of a bag made from the tube.

27. The multilayered film of claim 1, wherein the inner layer is heat-sealable.

28. The multilayered film of claim 1, wherein the inner layer is pulse-welded.

29. The multilayered film of claim 1, wherein the outer layer consists essentially of a polypropylene homopolymer, the connecting layer consists essentially of a polypropylene homopolymer and a thermoplastic elastomer, and the inner layer consists essentially of polypropylene homopolymer and a thermoplastic elastomer.

30. The multilayered film of claim 1 wherein the thermoplastic elastomer of the connecting layer and the inner layer is TPE-S.

31. The multilayered film of claim 1, wherein the connecting layer further consists of a plasticizer.

32. The multilayer film of claim 1, wherein the film is exactly three layers.

* * * * *